United States Patent Office 2,874,039
Patented Feb. 17, 1959

2,874,039
EXTRACTION OF SCANDIUM FROM ITS ORES

Emile Jean Baptiste Pruvot, Saint-Jean-de-Maurienne, France, assignor to Pechiney Compagnie de Produits Chimiques et Electrometallurgiques, Paris, France, a corporation of France No Drawing. Application June 13, 1955
Serial No. 515,251

Claims priority, application France June 17, 1954

2 Claims. (Cl. 75—84.5)

Ores which contain appreciable quantities of scandium are rare. However, two types of thorveitite are known:

(a) One found in Norway, which appears to be a double silicate of scandium and yttrium, having the approximate formula $$2SiO_2.Y_2O_3.Sc_2O_3$$

(b) And another which has been found in Madagascar, and appears to be a complex silicate of scandium, zirconium and aluminum. An analysis of this ore yields the following composition:

|  | Percent |
|---|---|
| Silica ($SiO_2$) | 43.7 |
| Scandium oxide ($Sc_2O_3$) | 42.6 |
| Zirconium oxide ($ZrO_2$) | 7.8 |
| Alumina ($Al_2O_3$) | 3.8 |
| Iron sesquioxide ($Fe_2O_3$) | 1.8 |

Up till now, the only methods proposed for separating scandium from yttrium and from the other elements have been wet methods which require numerous crystallizations; the latter are lengthy operations difficult to carry out, and the efficiency is relatively low.

The present invention, which is based on applicant's researches, relates to a simple and ready method for separating scandium from the other metals and impurities which are present in its ores. It consists in transforming into anhydrous chlorides the metals and metalloids, and thereafter separating the scandium chloride from the mixture by fractional sublimation.

The anhydrous chlorides of the metals and metalloids contained in the thorveitites have the following boiling or sublimation temperatures at atmospheric pressure:

Chlorides of—
  Silicon, $SiCl_4$, 57° C. (boiling temperature)
  Titanium, $TiCl_4$, 136° C. (boiling temperature)
  Aluminum, $AlCl_3$, 180° C. (boiling temperature)
  Iron, $FeCl_3$, 310° C. (sublimation temperature)
  Zirconium, $ZrCl_4$, 331° C. (sublimation temperature)
  Scandium, $ScCl_3$, 967° C. (sublimation temperature)
  Yttrium, $YCl_3$, 1507° C. (sublimation temperature)

It will thus be seen that these chlorides can be divided in three fractions:

(1) A very stable chloride of yttrium which only sublimates above 1500° C. and which also carries off all other chlorides of the rare elements which are sublimated between 1400° C. (Ce) and 1747° (La).

(2) An intermediate fraction, i. e. chloride of scandium, which is sublimated at 967° C.

(3) The other chlorides, namely of silicon, titanium, aluminum, iron, zirconium, all of which are sublimated below 350° C.

Hence, the method according to the present invention consists in passing a current of chlorine over an intimate mixture of finely divided thorveitite and carbon which has been heated to 900–1000° C. at one end of the apparatus to insure its transformation into chlorides, while the other end of the apparatus is being maintained at above 350° and, preferably, at 400° C., the temperature decreasing progressively from 900–1000° C. to 400° C.

The yttrium chloride remains at the hottest end of the apparatus, the volatile chlorides are eliminated from the apparatus in the vapor state, and the scandium chloride is deposited in the intermediate zone of the apparatus in a state of high purity.

The following example, which is given by way of illustration and not by way of limitation, will enable a better understanding of the invention.

Example 100 grams of Norwegian thorveitite containing 25% of scandium oxide and thoroughly ground so as to pass through a 200 mesh screen, are intimately mixed with 40 grams of calcined petroleum coke ground to the same fineness. The mixture is placed in a refractory boat located at one end of a quartz, porcelain or any other refractory tube, 80 mm. in diameter, which tube end is thereupon introduced into a muffle furnace heated to 950° C.; the remaining portion of the tube is located in a space heated in such a way that the temperature of its outer (downstream) end does not fall below 400° C. As soon as the desired temperature has been attained, a current of dry chlorine is passed over the mixture at a velocity of about 0.8 cm. per second. The removal of the scandium chloride is facilitated by placing the boat in a refractory tube concentric with the furnace so that, by sliding this auxiliary tube, the chloride can be immediately removed.

After six hours, the flow of chlorine is stopped and there is removed from the central portion of the tube, i. e. approximately the 950–600° C. zone, 48 grams of very white and pure anhydrous scandium chloride in the condition of pearly leaflets (scales); its purity is determined by a spectrograph or by analysis. The chlorination yield is about 87.5%; the 12.5% scandium oxide which has not been chlorinated remains in the boat. If desired, it may be recovered by known methods.

The anhydrous scandium chloride thus obtained can be transformed into the oxide, $Sc_2O_3$, by precipitation with ammonia, this treatment yielding 22 grams of the oxide.

Following transformation into the more stable oxides, the distribution of the various metals is as set forth in the following table:

| Temperature | 900° C. | 600° C. | 300° C. |
|---|---|---|---|
| Recovered products | Residue in the boat: $Y_2O_3$—$Yb_2O_3$+the residue of $Sc_2O_3$. | $Sc_2O_3$ on the side of and outside the boat. | $SiO_2$—$Fe_2O_3$ $Al_2O_3$, etc. |
| Percent by weight based on the ore. | 20 | 22 | 58. |

Scandium in the metallic state can be obtained by reducing the anhydrous chloride with sodium, magnesium, or calcium, also, by direct electrolysis of the molten chloride by known methods.

I claim:
1. The method of extracting scandium from ores con- taining at least one compound of other elements the chlorides of which volatilize at temperatures materially above and below the volatilization temperature of scandium chloride, said elements selected from the group consisting of silicon, titanium, aluminum, iron, zirconium and yttrium, comprising the following steps: finely grinding said scandium ore and intimately mixing the ground ore with finely divided carbon; establishing in an elongated zone a temperature gradient ranging from about 1000° C. to about 350° C.; introducing said mixture into the hottest region of said zone; chlorinating the mixture while in said hottest region, thereby forming anhydrous volatile chlorides of scandium and of at least some of said other elements; passing the evolved volatile chlorides through said elongated zone towards the cooler end thereof, whereby the scandium chloride separates out selectively in a solid state in an intermediate portion of said zone, and removing the scandium chloride so separated.

2. Method according to claim 1, characterized in that the removed scandium chloride is treated to recover scandium in a metallic state.

References Cited in the file of this patent

UNITED STATES PATENTS 2,675,890     Frey et al. _____ Apr. 20, 1954

FOREIGN PATENTS 466,705     Great Britain _____ June 2, 1937

OTHER REFERENCES

"Comprehensive Treatise on Inorganic and Theoretical Chemistry" (Mellor), published by Longmans, Green & Co. (London), 1924 (vol. 5, page 489 relied on).